US012697729B2

(12) United States Patent
Lima et al.

(10) Patent No.: US 12,697,729 B2
(45) Date of Patent: Aug. 4, 2026

(54) SYSTEM AND METHOD TO RECONSTRUCT HUMAN MOTION FOR MOBILE ROBOT TELEOPERATION USING SHARED CONTROL

(71) Applicant: Tata Consultancy Services Limited, Mumbai (IN)

(72) Inventors: Rolif Lima, Bangalore (IN); Vismay Dilipkumar Vakharia, Bangalore (IN); Utsav Rai, Bangalore (IN); Hardik Rajiv Mehta, Bangalore (IN); Aditya Choudhary, Bangalore (IN); Amitkumar Vinodbhai Parmar, Bangalore (IN); Kaushik Das, Bangalore (IN); Vighnesh Vatsal, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 18/825,458

(22) Filed: Sep. 5, 2024

(65) Prior Publication Data

US 2025/0108512 A1 Apr. 3, 2025

(30) Foreign Application Priority Data

Sep. 30, 2023 (IN) .............................. 202321065901

(51) Int. Cl.
  B25J 9/16 (2006.01)
  G05B 19/4155 (2006.01)
  G06F 3/01 (2006.01)

(52) U.S. Cl.
  CPC ........ B25J 9/1689 (2013.01); G05B 19/4155 (2013.01); G06F 3/011 (2013.01); G05B 2219/42058 (2013.01)

(58) Field of Classification Search
  CPC ........ B25J 9/1689; B25J 9/1697; B25J 9/163; G05B 2219/40147; G05B 2219/40151;
  (Continued)

(56) References Cited

U.S. PATENT DOCUMENTS

| | | | |
|---|---|---|---|
| 2013/0217352 A1* | 8/2013 | Pan ........................ | G16H 40/67 |
| | | | 340/539.12 |
| 2020/0124429 A1 | 4/2020 | Zhang et al. | |

(Continued)

OTHER PUBLICATIONS

Hulin et al., "Model-Augmented Haptic Telemanipulation: Concept, Retrospective Overview, and Current Use Cases," Frontiers in Robotics and AI, 8 (2021).

(Continued)

*Primary Examiner* — Nhi Q Bui
(74) *Attorney, Agent, or Firm* — Finnegan, Henderson, Farabow, Garrett & Dunner, LLP

(57) ABSTRACT

This disclosure relates to system and method to reconstruct human motion for mobile robot teleoperation using shared control. The method of the present disclosure acquire an input feed of a human operator to perform a task with assistance in a remote environment using shared control. The mobile robot reconstructs to follow a trajectory of the human operator towards the intended goal in the remote environment. The mobile robot determines at least one goal intended by the human operator based on a previously occurred state, a current kinematic state and a future trajectory of the human operator and a known position of the plurality of goals. The model predictive control generates at least one instruction to control the movement of the mobile robot to perform at least one of following the trajectory of the human operator and reaching the operator intended goal based on a joint angle position and a velocity.

18 Claims, 13 Drawing Sheets

(58) Field of Classification Search
CPC .......... G05B 2219/40153; G05B 2219/40174;
G05B 2219/40408; G05B 2219/40413;
G05B 2219/42058; G05B 19/4155; G05B
13/026; G05B 13/048; G06F 3/011
See application file for complete search history.

(56)                References Cited

U.S. PATENT DOCUMENTS

| | | | |
|---|---|---|---|
| 2021/0379763 A1* | 12/2021 | Denenberg ............. | B25J 9/1671 |
| 2023/0048578 A1* | 2/2023 | Campos Macias .... | B25J 9/1669 |
| 2023/0294277 A1* | 9/2023 | Yang ..................... | B25J 9/1605 |
| | | | 700/217 |
| 2024/0149458 A1* | 5/2024 | Watabe .................. | B25J 9/1689 |

OTHER PUBLICATIONS

Javdani et al., "Shared Autonomy via Hindsight Optimization,"
(2021).
Pires da Luz, "Model predictive control for assistive robotic manipu-
lation," Master of Science Degree Thesis (2021).
Zheng et al., "Human Arm Motion Prediction for Collision Avoid-
ance in a Shared Workspace," Sensors (2022).

* cited by examiner

200

300 acquire by a control unit of a mobile robot an input feed of a human operator, wherein the input feed is acquired during an assistance provided by the human operator to the mobile robot, to perform a task in a remote environment

302 receive by the control unit of the mobile robot executed in the remote environment, (i) a delayed kinematic state associated with a plurality of measurements of the human operator (ii) a timestamp of the delayed state, wherein the plurality of measurements corresponds to an arm position, a shoulder velocity, an elbow angular velocity, and a wrist angular velocity and

304 reconstruct by the control unit of the mobile robot to follow a trajectory of the human operator towards the intended goal in the remote environment

SYSTEM AND METHOD TO RECONSTRUCT HUMAN MOTION FOR MOBILE ROBOT TELEOPERATION USING SHARED CONTROL

PRIORITY CLAIM

This U.S. patent application claims priority under 35 U.S.C. § 119 to: Indian Patent Application number 202321065901, filed on Sep. 30, 2023. The entire contents of the aforementioned application are incorporated herein by reference.

TECHNICAL FIELD

The disclosure herein generally relates to reconstructing human motion, and, more particularly, to system and method to reconstruct human motion for mobile robot teleoperation using shared control.

BACKGROUND

Industry 4.0 and collaborative robots alternatively referred as cobots offer new types of intelligent information systems and automation. Collaborative robots operate in tandem with human operators enhancing security and productivity of production procedures. The envisioned goal increases interest in human-robot collaboration in industrial settings, as cobots are considered safe and robot behavior can be easily programmed, including through physical interactions. Telerobotics or Teleoperated robots is a popular and continuously evolving paradigm in such collaborative robotics community. Telerobotics enables human operator to manipulate objects in remote environments without requiring physical presence. While machine learning applications have enabled robots with autonomous capabilities teleoperation allows humans to apply their reasoning, creativity, and intuition to perform tasks that are difficult for autonomous agents. Such systems are best suited for critical tasks where autonomous systems may have unacceptable rates of error, such as nuclear waste handling, robotic surgery, space, and deep-sea exploration.

Existing techniques in telerobotics domain focus on bilateral teleoperation where haptic feedback is provided to the human operator, allowing them to improve system stability using force sensing. These techniques require additional hardware and instrumentation, impacting human operator overall motion capabilities increasing the overall cost of the system, including additional training requirements. However, such techniques are crucial to applications such as telerobotic surgery. Whereas for applications that involve known environments with known objects, such as a warehouse or retail stores with standard payloads, haptic feedback is not necessary.

In crucial applications, visual feedback from the remote environment along with shared capabilities are necessary to perform task(s) efficiently. However, teleoperation with only visual feedback requires the remotely located robot to have autonomous capabilities such as collision avoidance and determining the human operator intent to perform a specific task, thereby minimizing cognitive load that may arise due to the lack of haptic and visual feedback. Existing technique lack in predicting critical motion intended by the human operator during domain-specific tasks such as pick and place, which involve fine alignment of the end effector with the target.

SUMMARY

Embodiments of the present disclosure present technological improvements as solutions to one or more of the above-mentioned technical problems recognized by the inventors in conventional systems. For example, in one embodiment, a system to reconstruct human motion for mobile robot teleoperation using shared control is provided. The system includes acquiring by a control unit of a mobile robot an input feed of a human operator, wherein the input feed is acquired during an assistance provided by the human operator to the mobile robot, to perform a task in a remote environment, wherein the input feed comprises one or more actions of the human operator providing the assistance to perform the task comprising at least one goal among a plurality of goals, wherein the remote environment may or may not be shared between the human operator and the mobile robot. Further, the mobile robot receives a delayed kinematic state associated with a plurality of measurements of the human operator (ii) a timestamp of the delayed kinematic state, wherein the plurality of measurements corresponds to an arm position, a shoulder velocity, an elbow angular velocity, and a wrist angular velocity. The control unit of the mobile robot reconstructs to follow a trajectory of the human operator towards the intended goal in the remote environment, wherein the step comprises, identifying a future trajectory of the human operator based on (i) the delayed kinematic state associated with the plurality of measurements of the human operator and (ii) the timestamp of the delayed kinematic state to determine the intended goal. Further, at least one goal intended is determined by the human operator in the remote environment based on (i) a previously occurred state associated with the plurality of measurements, (ii) the current kinematic state associated with the plurality of measurements of the human, (iii) the future trajectory of the human operator, and (iv) a known position of the plurality of goals. Furthermore, at least one instruction is generated by a model predictive control of the mobile robot to control the movement of the mobile robot to perform at least one of (i) following the trajectory of the human operator, and (ii) reaching the operator intended goal based on a joint angle position and a velocity of the mobile robot.

In another aspect, a method reconstruct human motion for mobile robot teleoperation using shared control is provided. The method includes acquiring by a control unit of a mobile robot an input feed of a human operator, wherein the input feed is acquired during an assistance provided by the human operator to the mobile robot, to perform a task in a remote environment, wherein the input feed comprises one or more actions of the human operator providing the assistance to perform the task comprising at least one goal among a plurality of goals, wherein the remote environment may or may not be shared between the human operator and the mobile robot. Further, the mobile robot receives a delayed kinematic state associated with a plurality of measurements of the human operator (ii) a timestamp of the delayed kinematic state, wherein the plurality of measurements corresponds to an arm position, a shoulder velocity, an elbow angular velocity, and a wrist angular velocity. The control unit of the mobile robot reconstructs to follow a trajectory of the human operator towards the intended goal in the remote environment, wherein the step comprises, identifying a future trajectory of the human operator based on (i) the delayed kinematic state associated with the plurality of measurements of the human operator and (ii) the timestamp of the delayed kinematic state to determine the intended goal. Further, at least one goal intended is determined by the human operator in the remote environment based on (i) a previously occurred state associated with the plurality of measurements, (ii) the current kinematic state associated with the plurality of measurements of the human, (iii) the future trajectory of the human operator, and (iv) a known position of the plurality of goals. Furthermore, at least one instruction is generated by a model predictive control of the mobile robot to control the movement of the mobile robot to perform at least one of (i) following the trajectory of the human operator, and (ii) reaching the operator intended goal based on a joint angle position and a velocity of the mobile robot.

In yet another aspect, a non-transitory computer readable medium for acquiring by a control unit of a mobile robot an input feed of a human operator, wherein the input feed is acquired during an assistance provided by the human operator to the mobile robot, to perform a task in a remote environment, wherein the input feed comprises one or more actions of the human operator providing the assistance to perform the task comprising at least one goal among a plurality of goals, wherein the remote environment may or may not be shared between the human operator and the mobile robot. Further, the mobile robot receives a delayed kinematic state associated with a plurality of measurements of the human operator (ii) a timestamp of the delayed kinematic state, wherein the plurality of measurements corresponds to an arm position, a shoulder velocity, an elbow angular velocity, and a wrist angular velocity. The control unit of the mobile robot reconstructs to follow a trajectory of the human operator towards the intended goal in the remote environment, wherein the step comprises, identifying a future trajectory of the human operator based on (i) the delayed kinematic state associated with the plurality of measurements of the human operator and (ii) the timestamp of the delayed kinematic state to determine the intended goal. Further, at least one goal intended is determined by the human operator in the remote environment based on (i) a previously occurred state associated with the plurality of measurements, (ii) the current kinematic state associated with the plurality of measurements of the human, (iii) the future trajectory of the human operator, and (iv) a known position of the plurality of goals. Furthermore, at least one instruction is generated by a model predictive control of the mobile robot to control the movement of the mobile robot to perform at least one of (i) following the trajectory of the human operator, and (ii) reaching the operator intended goal based on a joint angle position and a velocity of the mobile robot.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

Figure 3:
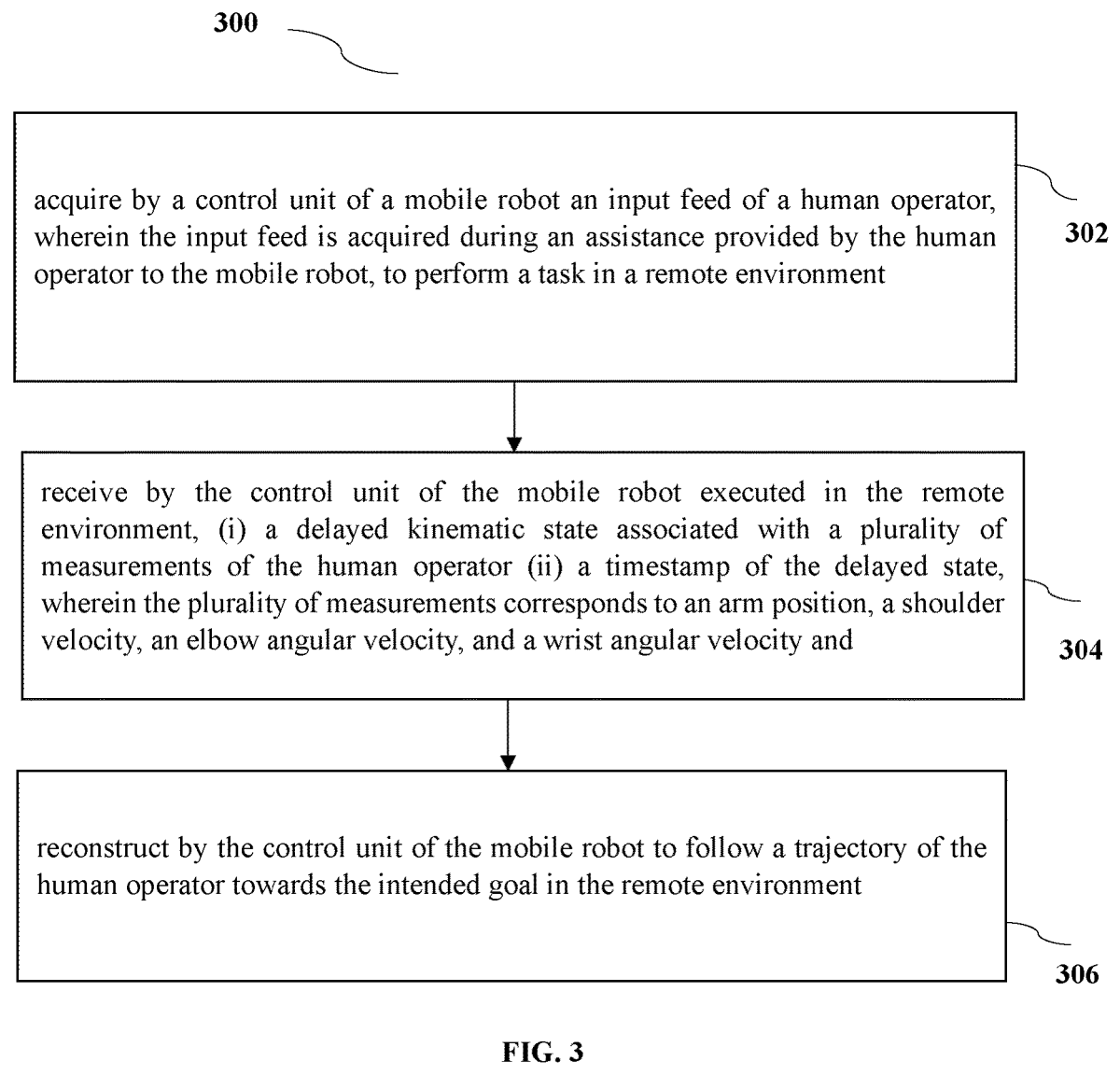

FIG. 3 illustrates an exemplary flow diagram to follow trajectory of the human operator towards an intended goal using the system of FIG. 1, in accordance with an embodiment of the present disclosure.

DETAILED DESCRIPTION

Figure 1:
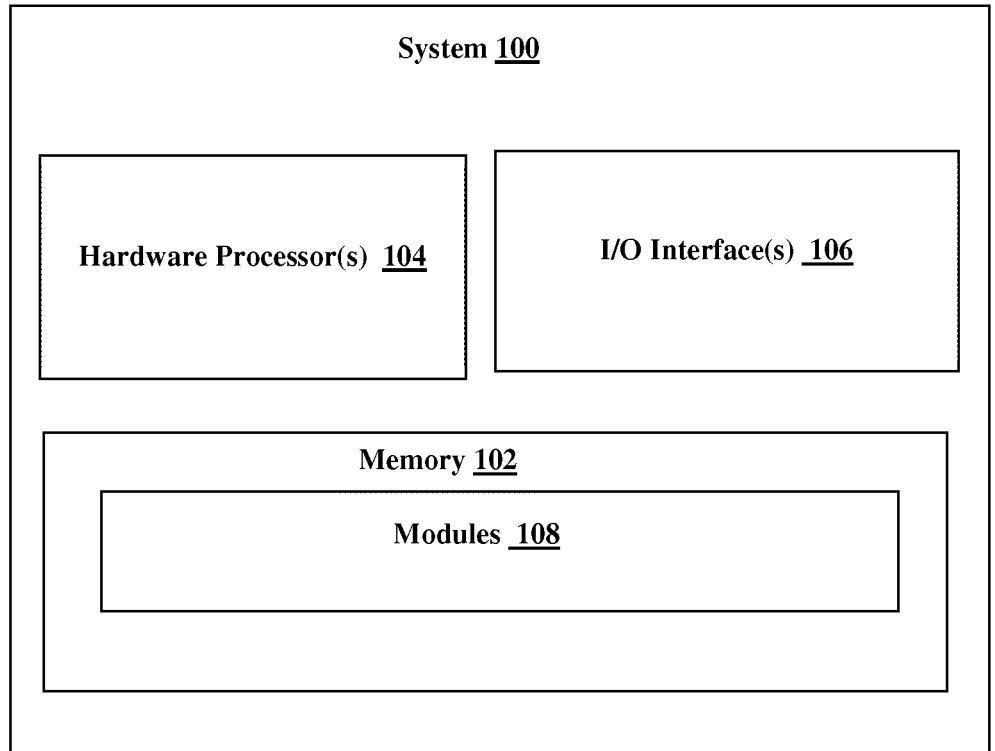
FIG. 1 is an illustrative system (alternatively referred as human motion reconstruction system), in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Human operator and mobile robot collaboration is gaining more and more interest in industrial settings, as collaborative robots are considered safe and robot actions can be programmed easily by, for example, physical interaction. Despite this, mobile robot programming mostly focuses on automated robot motions and interactive tasks or coordination between the human and the robot still requires additional developments. Shared autonomy-enabled teleoperation systems minimize the cognitive load on the human operator by providing autonomous assistance during task execution.

Teleoperation systems usually consist of a remotely located robot controlled by the human operator using a locally located control system connected over a communication network. The local control system allows the user to provide inputs to the remotely located mobile robot via different modalities such as customized master system, joystick, virtual reality (VR) controllers and the like while also providing feedback of the remote environment to the user through modalities such as audio, video, force feedback and the like. Such systems are designed to provide the user with experience of being present in the remote environment (tele-presence), it also introduces certain limitations due to the nature of modalities involved. This induces cognitive load on the operator thus hindering with the operator's ability to perform efficient manipulations. Most of the existing techniques rely on inverse kinematic parameters for computing joint reference angles of the robot to control the manipulator. Such approaches lack the ability to alter the input from the human operator in a collision scenario. The method of the present disclosure provides shared control approaches wherein the autonomous capabilities of mobile robot are leveraged to assist the human operator to complete the task.

As used herein, the term "robot" or a "mobile robot" may be understood to include any type of digitally controllable machine that is designed to perform a task or tasks. The reference is made herein to a "teleoperator" is a human operator controlling the robot from a distance. The term "human" or a "person" or a "human operator" may or may not collaborate or share a workspace with the robot. The term "network" may be referred as communication protocol to transmit data from the teleoperator to the mobile robot and vice versa.

The term "network" is defined as the communication medium connecting the human operator and the remotely located shared environment.

The term "goal" is the position of the human operator.

The term "kinematic state" defines a plurality of measurements of the human operator, wherein the plurality of measurement may include shoulder, wrist, arm and the like parts of the human body.

The term "delay time" is the time occurred when information is transferred from the human operator to the remotely located mobile robot over the internet. The delay may occur due to network transmission and the like.

The term "delay compensation" is the compensation achieved by propagating the delayed kinematic states from the human operator during transmission time.

The term "future state trajectory" is the future position of the human operator from the current state.

Embodiments herein provide a system and method to reconstruct human motion for mobile robot using shared control. The method provides efficient shared control between at least one human operator and a remotely located mobile robot with visual haptic feedback. Shared autonomy enabled teleoperation system minimizes cognitive load on the human operator by providing autonomous assistance during one or more tasks execution. The method provides teleoperation of the mobile robotic arm utilizing augmented state of the mobile robot collaborating the human operator inputs and the mobile robot autonomous assistance to provide final assistive control to the mobile robot. Further, the position information of the human operator arm is captured and a plurality of measurements of the human motion to be transmitted over an internet network. In addition, the present method is evaluated with a baseline teleoperation condition with an inverse kinematic (IK) controller to observe overall performance of the method. The disclosed system is further explained with the method as described in conjunction with FIG. 1 to FIG. 12 below.

Referring now to the drawings, and more particularly to FIG. 1 through FIG. 12, where similar reference characters denote corresponding features consistently throughout the figures, there are shown preferred embodiments and these embodiments are described in the context of the following exemplary system and/or method.

FIG. 1 is an illustrative system (alternatively referred as human motion reconstruction system), in accordance with some embodiments of the present disclosure. In an embodiment, the human motion reconstruction system 100 includes processor(s) 104, communication interface(s), alternatively referred as or input/output (I/O) interface(s) 106, and one or more data storage devices or memory 102 operatively coupled to the processor(s) 104. The system 100, with the processor(s) is configured to execute functions of one or more functional blocks of the system 100.

Referring to the components of the system 100, in an embodiment, the processor(s) 104 can be one or more hardware processors. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the processor(s) 104 is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud, and the like.

The I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface(s) 106 can include one or more ports for connecting a number of devices (nodes) of the system 100 to one another or to another server.

The memory 102 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes.

Figure 2:
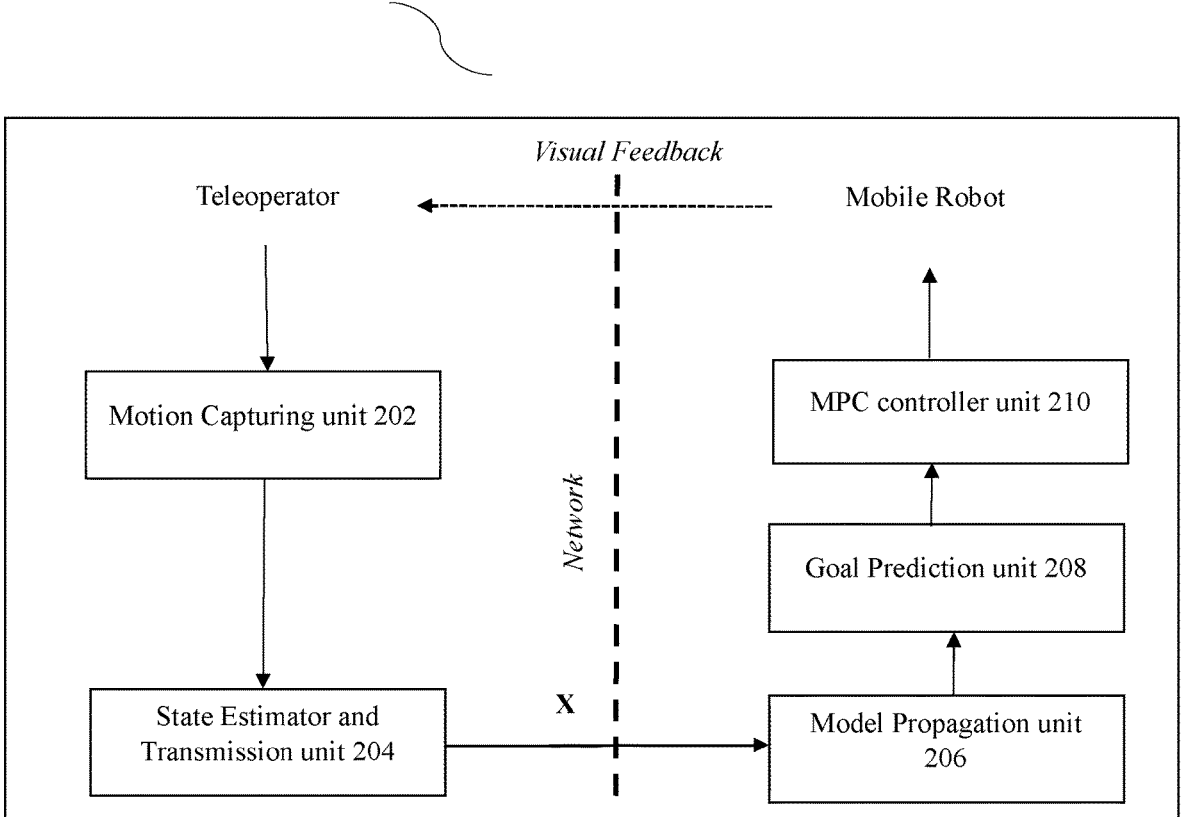
FIG. 2 illustrates an exemplary block diagram to reconstruct human motion for mobile robot teleoperation using shared control using the system of FIG. 1, in accordance with an embodiment of the present disclosure.

In an embodiment, the memory 102 includes a plurality of modules 108 can also include various sub-modules as depicted in FIG. 2 such as a motion capturing unit 202, a state estimator and transmission unit 204, a model propagation unit 206, a goal prediction unit 208 and a model predictive controller unit 210. The plurality of modules 108 include programs or coded instructions that supplement applications or functions performed by the system 100 for executing different steps involved in the process of reconstructing human motion of the system 100. The plurality of modules 108, amongst other things, can include routines, programs, objects, components, and data structures, which performs particular tasks or implement particular abstract data types. The plurality of modules 110 may also be used as, signal processor(s), node machine(s), logic circuitries, and/or any other device or component that manipulates signals based on operational instructions. Further, the plurality of modules 108 can be used by hardware, by computer-readable instructions executed by the one or more hardware processors 104, or by a combination thereof.

The memory 102 may comprise information pertaining to input(s)/output(s) of each step performed by the processor(s) 104 of the system 100 and methods of the present disclosure. Functions of the components of system 100, for identifying malicious agent while handling user request having at least one sensitive attribute, are explained in conjunction with FIG. 2 and FIG. 3 providing flow diagram, architectural overviews, and performance analysis of the system 100.

FIG. 2 illustrates an exemplary block diagram to reconstruct human motion for mobile robot teleoperation using shared control using the system of FIG. 1, in accordance with an embodiment of the present disclosure. The system 200 may be an example of the system 100 (FIG. 1). In an example embodiment, the system 200 may be embodied in, or is in direct communication with the system, for example the system 100 (FIG. 1). In an embodiment, the system 200 may be alternatively referred as a goal prediction system. The system 200 includes a motion capturing unit 202, a state estimator and transmission unit 204, a model propagation unit 206, a goal prediction unit 208 and a model predictive controller unit 210.

The system 200 may receive a request to perform a task in the mobile robot in a shared environment. The human operator may have shared environment with the mobile robot, or the mobile robot may independently function the task or the combination of thereof. Teleoperator is the human operator controlling the remotely located robotic device from a distance. The task may include a series of actions to be performed using shared control and the task may be pick-and-placement, hand-over, and the like. Teleoperator may trigger the command via a speech-based, motion based or by a graphical command-based interface or combination of these and the like.

For example, the human operator may be tasked to perform picking an object and placing the selected object in a designated area in the workspace. The remotely located mobile robot may not be aware of the selected object and placement. This involves coordination of tasks to be performed with the shared control between the mobile robot and the teleoperator, where the mobile robot respond to requested commands sent by the operator.

The motion capturing unit 202 of the system 200 estimates a current kinematic state associated with the plurality of measurements of the human operator of the given task. The motion capturing unit 202 extracts position and orientation corresponding to the human operator arm movements using extrinsic sensors such as an RGB camera, a depth camera or virtual reality (VR), a proprioceptive sensors that includes an IMU, at least one position encoders and the like.

The state estimator and transmission unit 204 of the system 200 estimates the human operator position and velocity obtained from the motion capturing unit 202 as measurements for the extended Kalman filter (EKF) which is used to estimate kinematic states of the simplified relative kinematic model of the human operator.

The model propagation unit 206 of the system 200 determines the human operator trajectory by propagating the kinematic states associated with the plurality of measurements of the human operator position estimated using the EKF.

The goal prediction unit 208 determines the human operator intended goal position to be reached by the remotely located mobile robot in the shared control environment.

The model predictive controller unit 210 determines the mobile robot joint position, the velocity trajectory and orientation of the end effector corresponding to the human operator palm position and orientation to reach the human operator intended goal.

FIG. 3 illustrates an exemplary flow diagram to follow trajectory of the human operator towards an intended goal using the system of FIG. 1, in accordance with an embodiment of the present disclosure. In an embodiment, the system 100 comprises of one or more data storage devices or the memory 102 operatively coupled to the processor(s) 104 and is configured to store instructions for execution of steps of a method 300 by the processor(s) or one or more hardware processors 104. The steps of the method 300 of the present disclosure will now be explained with reference to the components or blocks of the system 100 as depicted in FIG. 1 through FIG. 2, and the steps of flow diagram as depicted in FIG. 3 through FIG. 12. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Referring to the steps of the method 300, at step 302 a one or more hardware processor enable acquiring by a control unit of a mobile robot an input feed of a human operator, wherein the input feed is acquired during an assistance provided by the human operator to the mobile robot, to perform a task in a remote environment. The input feed comprises one or more actions of the human operator providing the assistance to perform the task comprising at least one goal among a plurality of goals.

Referring to the above example, to perform the teleoperation task the mobile robot follow at least one command of the human operator. If the autonomous agent modifies the human operator commands and if the mobile robot movements deviate from those directed by the human operator, the human operator can change the control inputs until it receives appropriate feedback from the mobile robot. Additionally, the mobile robot reaches the destination avoiding collisions with obstacles.

Here, the motion capturing unit 202 utilizes the virtual reality setup to capture the human operator arm position and orientation corresponding to the head-mounted display, a binary toggle switch is used to trigger the gripping action and the like.

Referring to the steps of the method 300, at step 304 the one or more hardware processors receiving by the control unit of the mobile robot in the remote environment (i) a delayed kinematic state associated with a plurality of measurements of the human operator (ii) a timestamp of the delayed kinematic state, wherein the plurality of measurements corresponds to an arm position, a shoulder velocity, an elbow angular velocity, and a wrist angular velocity.

The plurality of kinematic state of the human operator includes at least one of (i) computing a first azimuth angle and an first elevation angle made by the link connecting a shoulder frame and an elbow frame at the shoulder frame, (ii) a rate of change of the first azimuth angle and the first elevation angle, (iii) computing a second azimuth angle and a second elevation angle made by the link connecting an elbow frame and a wrist frame at the elbow frame, and (iv) a rate of change of the second azimuth angle and the second elevation angle.

Figure 4:
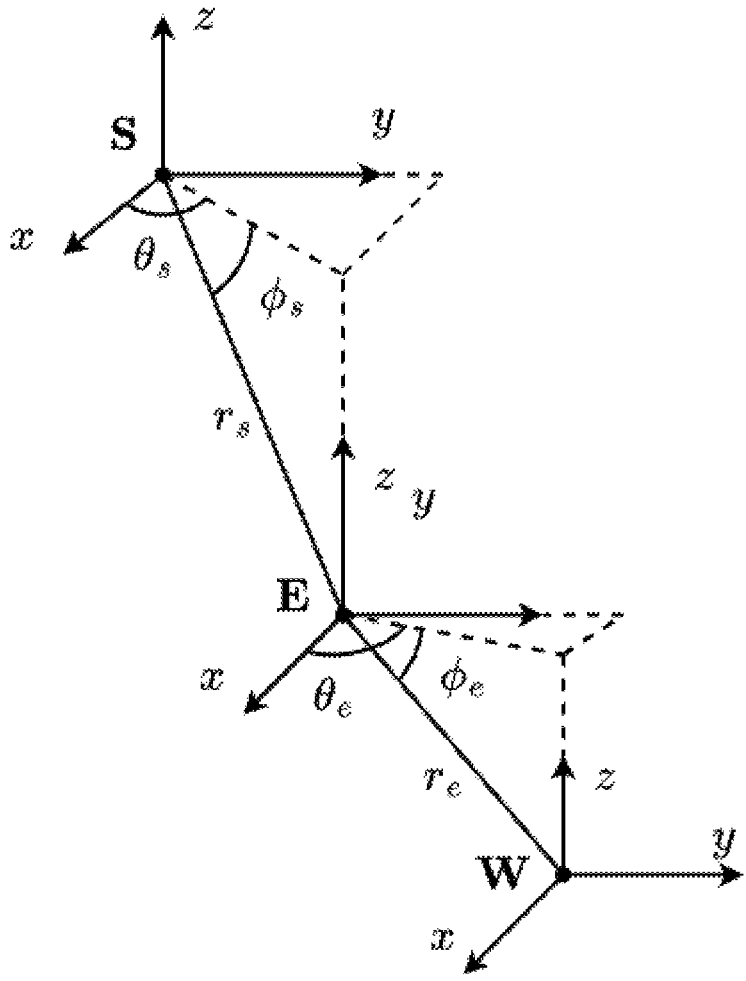
FIG. 4 illustrates an exemplary kinematic structure of the human operator movement using the system of FIG. 1, in according to some embodiments of the present disclosure.

The relative kinematic model as depicted in FIG. 4, determines the delayed kinematic state associated with the plurality of measurements of the human operator comprising the shoulder frame, the elbow frame and the wrist frame as described in Equation 1 and Equation 2, $$\begin{bmatrix} x_e \\ y_e \\ z_e \end{bmatrix} = \begin{bmatrix} x_s \\ y_s \\ z_s \end{bmatrix} + \begin{bmatrix} r_s \cos{(\phi_s)} \cos{(\theta_s)} \\ r_s \cos{(\phi_s)} \sin{(\theta_s)} \\ r_s \sin{(\phi_s)} \end{bmatrix} \qquad \text{Equation 1}$$

$$\begin{bmatrix} x_w \\ y_w \\ z_w \end{bmatrix} = \begin{bmatrix} x_e \\ y_e \\ z_e \end{bmatrix} + \begin{bmatrix} r_e \cos{(\phi_e)} \cos{(\theta_e)} \\ r_e \cos{(\phi \varphi_e)} \sin{(\theta_e)} \\ r_e \sin{(\phi_e)} \end{bmatrix} \qquad \text{Equation 2}$$

where, (•)s, (•)e and (•)w corresponds to the quantities related to the shoulder frame, the elbow frame and the wrist frame {S, E, W} respectively.

$\theta(\bullet)$ and $\phi(\bullet)$ corresponding to the azimuth angle and the elevation angle respectively $r(\bullet)$ representing the link lengths.

The rate of change of $\theta(\bullet)$ and $\phi(\bullet)$ for individual pair of joints is determined by the plurality of kinematic states as defined in Equation 3, and Equation 4, $$V_\theta = \qquad\qquad\qquad\qquad \text{Equation 3}$$
$$r_{(.)} \dot{\theta}_{(.)} \cos(\phi_{(.)}) = V_B \cos(\eta) \sin(\mu - \theta_{(.)}) - V_A \cos(\alpha) \sin(\beta - \theta_{(.)})$$

$$V_\phi = r_{(.)} \dot{\phi}_{(.)} = V_B \{ -\cos(\eta) \sin(\phi_{(.)}) \cos(\mu - \theta_{(.)}) + \sin(\eta) \cos(\phi_{(.)}) \} - \qquad \text{Equation 4}$$
$$V_A \{ -\cos(\alpha) \sin(\phi_{(.)}) \cos(\beta - \theta_{(.)}) + \sin(\alpha) \cos(\phi_{(.)}) \}$$

where, $V_A$ and $V_B$ represents the magnitudes and velocities of consecutive joints for (shoulder-elbow pair), $V_A$ represents the shoulder frame, $V_B$ represents the elbow angular velocity, and with ($\beta$, $\alpha$) and ($\mu$, $\eta$) with corresponding azimuth angle and the elevation angle.

Further, the state estimator and transmission unit 204 of the system 200 estimates the human operator position and velocity obtained from the motion capturing unit 202 to obtain filtered estimates of model states $X_T(t) = [(\theta_s, \varphi_s), (\dot{\theta}_s, \dot{\varphi}_s), (\theta_s, \varphi_s), (\dot{\theta}_e, \dot{\varphi}_e)]^T$ as defined in Equation 3 and Equation 4.

Furthermore, the remotely located mobile robot obtains the delayed kinematic states associated with the plurality of measurements of the human operator as $X_T$ (t−τ) observed are received after a time delay of τ sec to smoothly update the remote the kinematic states $X_R$ (t−τ) as defined in Equation 5, $$X_R(t-\tau) := X_R(t-\tau) + \lambda(X_T(t-\tau) - X_R(t-\tau)) \qquad \text{Equation 5}$$

Where, $\lambda < 1$ prevents jerky motions which may otherwise arise if a hard update is used.

Referring to the steps of the method 300, at step 306 the one or more hardware processors reconstructing by the control unit of the mobile robot to follow a trajectory of the human operator towards the intended goal in the remote environment.

Here, the model propagation unit 206 identifies a future trajectory of the human based on (i) the delayed kinematic state associated with the plurality of measurements of the human and (ii) the timestamp of the delayed kinematic state to determine the intended goal.

Here, the future trajectory of the human operator is generated by propagating the Equation 3 and Equation 4 with the newly updated kinematic states $X_R$ and converting the angular trajectories to the angular wrist positions using the Equation 1 and Equation 2. Since the reception of the model parameters is inevitably affected by the latency of τ sec over the internet network and it is required to compensate the delayed kinematic state occurred due to the network.

Figure 5:
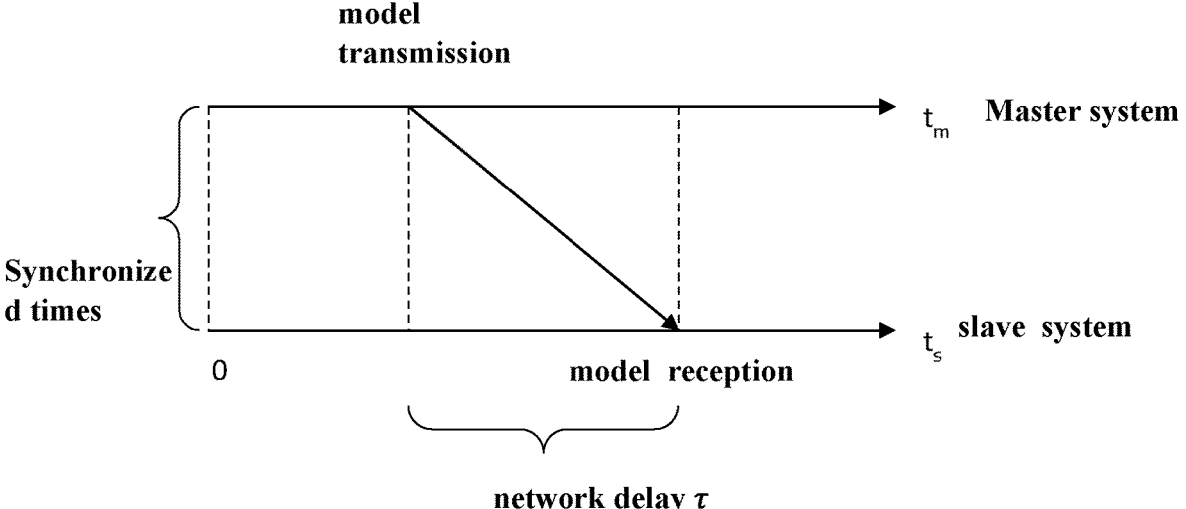
FIG. 5 illustrates an exemplary time delay obtained during transmission of the human operator states over internet network using the system of FIG. 1, in accordance with some embodiments of the present disclosure.

Referring now FIG. 5, where the compensation is achieved by propagating the delayed states from the human operator at time t as depicted in Equation 6, $$\hat{X}_{R(t)} = \int_{t-\tau}^{t} f(X_R(t-\tau)) dt \qquad \text{Equation 6}$$

where, $f(\bullet)$ denotes the state transition function for propagating the obtained delayed kinematic states $X_R$ (t−τ). Delayed kinematic state provides estimate of the position where the human operator would reach at the current time.

The delay time is a difference between the timestamp of (i) the delayed kinematic state associated with the plurality of measurements of the human operator received by the mobile robot and (ii) the current time stamp of the mobile robot.

The delay compensated state is estimated at every time step based on (i) the delayed kinematic state associated with the plurality of measurements of the human operator, the delay time, the current time stamp of the mobile robot.

The goal prediction unit 210 determines at least one goal intended by the human operator in the remote environment based on (i) a previously occurred state associated with the plurality of measurements, (ii) the current kinematic state associated with the plurality of measurements of the human, (iii) the future trajectory of the human operator, and (iv) a known position of the plurality of goals.

Each goal may be considered as the position of the human operator trying to reach and may be the position of the goal that the human operator is trying to pick or the position of a placement point. This includes terminal position in the human operator predicted trajectory as one of the goal corresponding to human operator tracking mode.

Here, a goal score is computed for each goal among the plurality of goals based on (i) a distance between instantaneous human operator position and each goal position, and (ii) human operator velocity towards each goal. Further, a goal confidence is computed from the corresponding goal score of each goal to determine the human operator intended goal. Further, a long term confidence is computed using an exponential smoothing of the goal confidence to transfer control from the human operator to the mobile robot to reach at least one goal intended by the human operator based on the long term confidence in the remote environment.

In one embodiment, the control is transferred from the human operator to the mobile robot when the long term confidence exceeds a goal confidence threshold.

The instantaneous human operator position and velocity is determined from the plurality of measurements of the human operator as depicted in Equation 7 and Equation 8, $$G := \{g_1, g_2, g_3, \dots, g_N\} \qquad \text{Equation 7}$$

-continued $$s_i = \left( \frac{k}{(1 - \hat{X}^{\overline{xi}} + \delta)^2} \cdot \frac{1}{(1 + e^{-\gamma(\|\hat{X}\|)^2} - \beta)} \right) e^{-w\|\hat{x} - g_i\|^2} \qquad \text{Equation 8}$$

where, $g_i$ is the $i^{th}$ goal in goal set G consisting of N goals, $[\hat{X}, \hat{\dot{X}}]$ representing the estimate of the human operator position and velocity computed using the estimated human operator kinematic states $\hat{X}_{R(t)}$ in the relative kinematic model as given in the Equation 2. (k, w, $\gamma$ and $\beta$) are tuning parameters, when $\delta \ll 1$ is a scalar constant used to prevent the denominator from going to zero, and $s_i$ is the score for goal $g_i$ ($\bullet$) is used to denote unit vectors of the respective vectors. The first term in the scoring function corresponds to the velocity to the score, while the term $e^{-\|\hat{x} g_i\|^2}$ corresponds to the distance. The velocity is designed such that a higher score is allocated to the goal score towards which the velocity vector as directed. The goal score of the total component is adjusted based on the magnitude of the velocity, with its value going to unity as velocity magnitude goes to zero, allowing only distance score to contribute the final score.

Further, S represent a plurality of goal scores for all the goals $g_i$ in the current iteration as in Equation 9, $$S = [s_1, s_2, \dots s_n]^T \qquad \text{Equation 9}$$

Due to the human operator motion and measurement noise, the plurality of goal scores associated with individual goal may vary in every iteration. This may lead to fluctuating goals if chosen based on maximum goal score. In order to prevent this, an instantaneous goal confidence is computed for individual goals recursively as an expectation of goal occurrences. Further, the long term goal confidence is computed for all the goals by assigning the goal with the highest score as the candidate, and a one-hot encoded vector with ones corresponding to the identified goal index is used for updating the long term confidence using the following recursion as in Equation 10, $$H := [h_1 \quad h_2 \quad \dots \quad h_N] \; h_i = \left\{ \begin{array}{l} 1 \text{ if } i = j \\ 0 \text{ otherwise} \end{array} \right\} \qquad \text{Equation 10}$$

where, ($\bullet$)t corresponds to $i^{th}$ iteration. When the goal confidence for any goal exceeds a threshold value, it is passed on to the controller of the mobile robot for autonomous approach to its position as in Equation 11, Goal Confidence Score $$C_0 = [0\, 0\, 0\, \dots\, 0] \qquad \text{Equation 11}$$

$$C_t = C_{t-1} + \alpha(H - C_{t-1})$$

The human operator velocity is below a goal confidence threshold $\kappa$, which causes the terminal state of predicted trajectory (human operator goal) to lie very close to the current human operator position leading to high score. In such scenario the human operator goal score is excluded from the score set S,

```
if ||o 'x||2 ≥ κ then
    j = argmax{S}
else
    j = argmax{S\ so}
end if
```

Then, the human operator control is transferred to the mobile robot which is remotely located to reach the human operator intended goal.

Further, a model predictive control generates at least one instruction by a model predictive control of the mobile robot to control the movement of the mobile robot to perform at least one of (i) following the trajectory of the human operator, and (ii) reaching the operator intended goal based on a joint angle position and a velocity of the mobile robot.

In one embodiment, the future position trajectory of the human operator is obtained as a reference for the model predictive control. Further, a cost function is computed based on the goal confidence to minimize error between the position and orientation of the end effector of the mobile robot and the wrist position and orientation of the human operator based on (i) a future position trajectory of the human operator obtained from the future kinematic state associated with the plurality of measurements of the human operator, (ii) a collision avoidance constraint, (iii) a singular avoiding constraint and (iv) a joint limit constraint.

The human operator is tracked when the goal confidence is lesser than the goal confidence threshold. The mobile robot moves towards the identified intended goal of the human operator when the goal confidence is higher than the goal confidence threshold.

Here, the optimal control problem is formulated to determine joint positions and velocity trajectories of mobile robot(s). This minimizes errors in the cartesian position and orientation of the end effector relative to the position and orientation of the human operator palm. In addition, restrictions are added to avoid collisions between the robot arm and the table and avoid entering unusual configurations. The joint angle dynamics are modeled using a double integrator system representing the dynamics of the damping system. This selection is made due to the presence of an internal loop controller within the robot to track the provided reference joint angles is represented in Equation 12. The kinematic state is taken as joint angles and angular rates $[\theta, \dot{\theta}]^T \in R^{12 \times 1}$ and angular accelerations are taken as the control input $u = \ddot{\theta}$.

$$\begin{bmatrix} \dot{\theta} \\ \ddot{\theta} \end{bmatrix} = \begin{bmatrix} 0 & I \\ 0 & 0 \end{bmatrix} \begin{bmatrix} \theta \\ \dot{\theta} \end{bmatrix} + \begin{bmatrix} 0 \\ I \end{bmatrix} u \qquad \text{Equation 12}$$

In one embodiment, additionally the cost function enables to track the mobile robot or the human operator with varying modes, wherein at least one mode may be active or the like. In one embodiment, the cost function is a quadratic cost function used to minimize errors in the position and orientation of the end effector relative to the human operator wrist. In order to ensure that the mobile robot motion is in synchronous with the human operator, a reference tracking cost is used similarly to assist the user to the goal when approaching the target goal utilizing a goal tracking cost. The transition from the human operator tracking to the goal tracking is regulated using a scalar weight computed using the predicted trajectory for the mobile robot as in Equation 13, $$\min_{x,u} j(x, u; g) = \sum_i (w_{min} \|x(i) - x_d(i)\|)_Q +$$      Equation 13

$$\|(u(i) - u_d(i)\|R + \sum_j (1 - w(j))\|gR_b(x(i) - g)\|p)$$    5 where, i is the $i^{th}$ state and control element in the trajectory, scalar weight is computed as $w(j)=1/(1+\exp(\beta-\alpha\|(x-g)\|)$ for the $j^{th}$ goal with tuning parameters $\alpha$ and $\beta$ and $w_{min}$ is minimum of all the computed weights. Q, R and P are the diagonal positive definite weighing matrices. $gR_b$ represents the rotation matrix to reconstruct the relative vector from the mobile robot to the goal. The notation $\|(\bullet)\|(*)$ is used to represent the quadratic form, that is $\|(x-x_d)\|Q$ corresponds to $(x-x_d)^T Q (x-x_d)$. The scalar weight w is designed to smoothly shift from tracking user commands to assisting the user to reach a goal of interest based on user states. In order to ensure that robot approached the goal only in desirable direction we first reconstruct the relative position between the mobile robot end effector and the goal from the mobile robot base to the goal using the rotation matrix $gR_b$ followed by scaling it with the diagonal matrix P accordingly to minimize the error in certain direction more rapidly than the other. The reference trajectory $x_d$ is generated by forward propagation of constant velocity model wherein the filtered stated for the model are obtained using a Kalman filter.

Additionally, the joint angular velocity cost is considered to minimize the robot's motion speed and reduce damage to the robot. The squared cost of control inputs is also added to penalize large control measures as in Equation 14, $$J(\theta, u) = \sum_{j=0}^{N} e_j^T Q_a e_k + \dot{\theta}_j^T Q_a \dot{\theta}_j + u_j^T R u_j$$      Equation 14 where,
e=$[x_j-\hat{}x(\theta)_j, q_j-\hat{}q(\theta)_j]^T \in R^7 \times 1$ represents error in position and orientation,
x represents the position.
q representing quaternion orientation of the human operator palm during teleoperation and when goal confidence exceeds the goal confidence threshold.
($\hat{\bullet}$) ($\theta$) represents corresponding quantity obtained using the forward kinematics of the mobile robot.
$Q_a \in R^{7\times7}$, $Q_b \in R^{6\times6}$ and $R \in R^{7\times7}$ are the weighing matrices for the errors, joint rates, and control inputs respectively, with $Q_a$ and $Q_b$ being symmetric positive semidefinite and R being symmetric positive definite.

Singularity Constraint: When the singularity constraint occurs, the Jacobian function that relate the cartesian and the angular velocities of the end effector to the joint angular velocities become singular leads to significant joint velocities and unexpected rapid movements of the mobile robot. Here, the singularity constraint is depicted in Equation 15, Equation 15

$$\det(J(\theta)JT(\theta))1/2 > \varepsilon$$      (10)

where, $J(\theta)$ is the Jacobian matrix and $\varepsilon < 1$ is an empirically chosen positive constant.

Collision Avoidance Constraint: In order to prevent collisions with large planar objects such an affine constraint of the form is depicted in Equation 16, $$An + b \geq 0$$      Equation 16

Where,
n is the unit normal to the plane with which collision is to be avoided
A is the matrix with rows as points of interest
$\hat{x}_i(\theta)$ on the body of the mobile robot that should avoid collision with the plane. Similarly, to avoid collision with smaller objects, an ellipsoidal constraint is used to restrict the motion of the point of interest $\hat{x}_i$ ($\theta$) from entering the enclosed ellipsoid around objects in the workspace as in Equation 17. This constraint prevents self-collision by appropriately choosing reference points on the mobile robot body.

$$(\hat{x}_i(\theta) - x_{ref})^T RMR^T (\hat{x}_i(\theta) - x_{ref}) > \alpha$$      Equation 17

Where,
M is a diagonal matrix.
R is the rotation matrix defining the orientation of the ellipsoid,
$x_{ref}$ is the reference position around which the ellipsoidal constraint is fitted
$\alpha$ is chosen empirically to enclose the object in the ellipsoid.

Joint constraint for mobile robot configuration: For a given position and orientation of the end effector of the mobile robot there are several joint angle configurations and solutions that can be obtained to solve the optimal control problem. These depend on the initial conditions provided to the solver and may correspond to undesired poses of the mobile robot. In order for the mobile robot to assume the desired pose, the joint angles of the mobile robot are constrained to stay within certain limits using boundary constraints as depicted in Equation 18, $$\theta_i^{min} \leq \theta_i \leq \theta_i^{max}$$      Equation 18

Where, $\theta_i$ is the desired value for $i^{th}$ joint.

In one embodiment, Inverse kinematic controller is considered as a baseline controller for performance comparison. The inverse kinematics (IK) solver is used to calculate the reference joint angles of the manipulator. Depending on the location and orientation, IK offers several solutions. Additionally, when operating a table (as selected object) in the shared workspace, the mobile robot must take an appropriate posture and configuration depending on the task. To achieve these goals, a weighted least squares method to select reference joint positions from the set of solutions obtained from the IK solver for the desired end effector position and orientation as in Equation 19, $$\theta = \text{argmin} \sum_i^N \|\theta - \theta_i\|^2 w_i + \|\theta - \theta_d\|^2 w_d$$      Equation 19 where, $\|\cdot\|w_i$ represents weighted norm of difference in the IK solution $\theta$ and the last solution $\theta_l$ and desired joint configuration $\theta_d$ respectively with weight matrix $w_i$ and $w_d$. For autonomously traversing to the goal, a minimum jerk trajectory is planned from the end-effector to the goal at every iteration, and only the first element of the trajectory is used in IK during execution.

Figure 6:
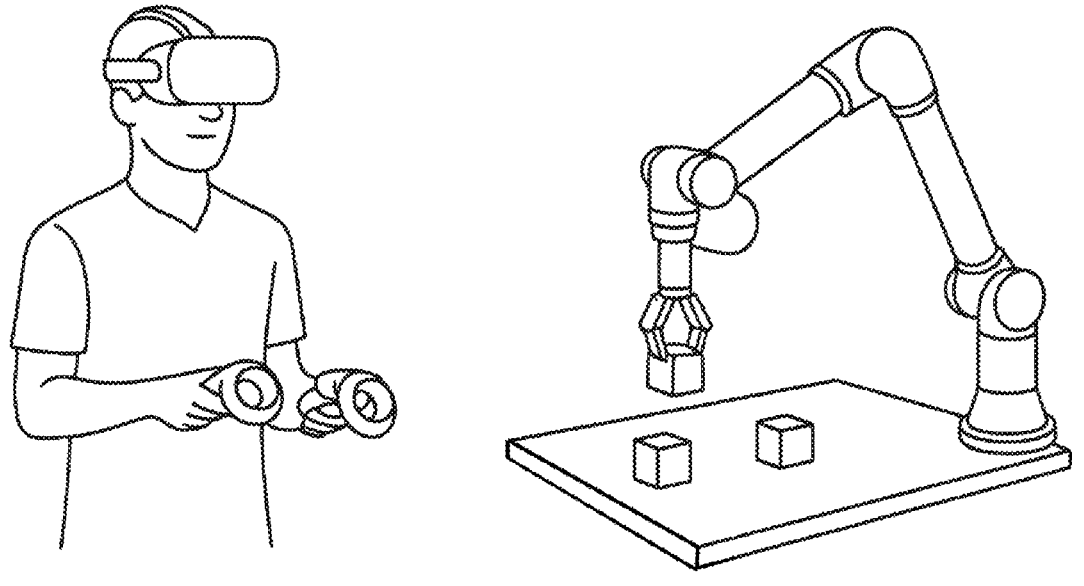
FIG. 6 illustrates an exemplary mobile robot teleoperation system where the human operator may be collaborating with the mobile robot using the system of FIG. 1, in accordance with some embodiments of the present disclosure.

FIG. 6 illustrates an exemplary mobile robot teleoperation system where the human operator may be collaborating with the mobile robot using the system of FIG. 1, in accordance with some embodiments of the present disclosure. The method of the present disclosure is the evaluation of block manipulation tasks performed on an Internet network. The task was to select three square blocks and place them in a given order and at a specific location. A universal mobile robot UR5e equipped with a Robotiq 2F-85 two-finger gripper was used to perform the task shown in FIG. 6. An HTC Vive VR system was used for motion capture. The position of the human operator right arm, elbow, and wrist was determined using a handheld his tracker attached to the elbow.

Parameters used in the evaluation are as follows: soft update constant $\alpha$ was set to 0.5, and the parameters $\beta$ and $\gamma$ were taken to be 0.2 and 30, respectively, k and w were set to 1 in the goal scoring function, $\delta$ for the human operator terminal goal was set to $10^{-2}$, while for other goals it was set to zero. $Q_a$=diag ([5,5,5,1,1,1,1]), $Q_b$=(0.001)$I_6$, R(0.001)$I_6$, while $\epsilon$ was taken to be $10^{-3}$.

The joint limits were set to $\theta_{min}$=[−1.2,−1.6, −3.14, −1.2, 1.2,−3.14] and $\theta_{max}$=[−1.4, −1.8, 3.14, −1.4, 1.4, 3.14]. All the constraints were treated as soft constraints to prevent solvers from failing due to infeasible solutions. The model predictive control is implemented using the ACADO toolkit with a time horizon of 2 sec and discretization step size of 0.1 sec.

Figure 7:
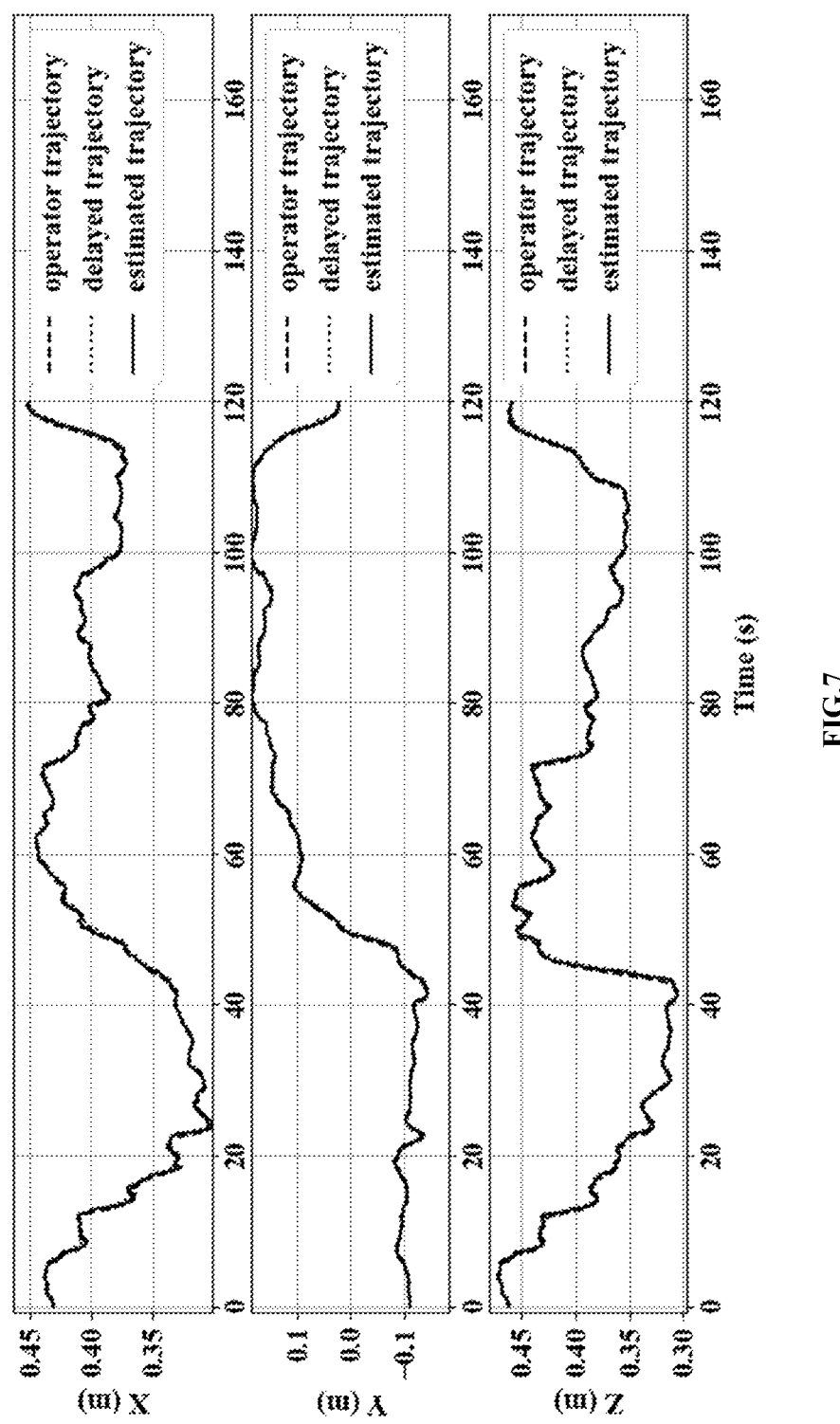
FIG. 7 illustrates an exemplary trajectories plots of commanded human operator input and the mobile robot trajectories using the system of FIG. 1, in accordance with some embodiments of the present disclosure.

FIG. 7 illustrates an exemplary trajectories plots of commanded human operator input and the mobile robot trajectories using the system of FIG. 1, in accordance with some embodiments of the present disclosure. The method of the present disclosure is evaluated using the network architecture having Robot Operating System (ROS) in a Master-Slave configuration deployed over an Amazon Web Services (AWS) cloud platform. To allow remote connection between the ROS master and the ROS slave securely, a Virtual Private Network (VPN) setup is used by running an OpenVPN server on a Virtual Private Cloud (VPC). This network architecture provides complete control over the internet network and eliminates the usage of public IP. The human operator is provided with real-time stereoscopic video captured on the mobile robot that is shared using a WebRTC based video streaming solution. A Gstreamer-based video streaming framework that takes a live camera input as the video source, which is further encoded into a WebRTC compatible format, allowing remote peers to receive the video in real-time.

Figure 8:
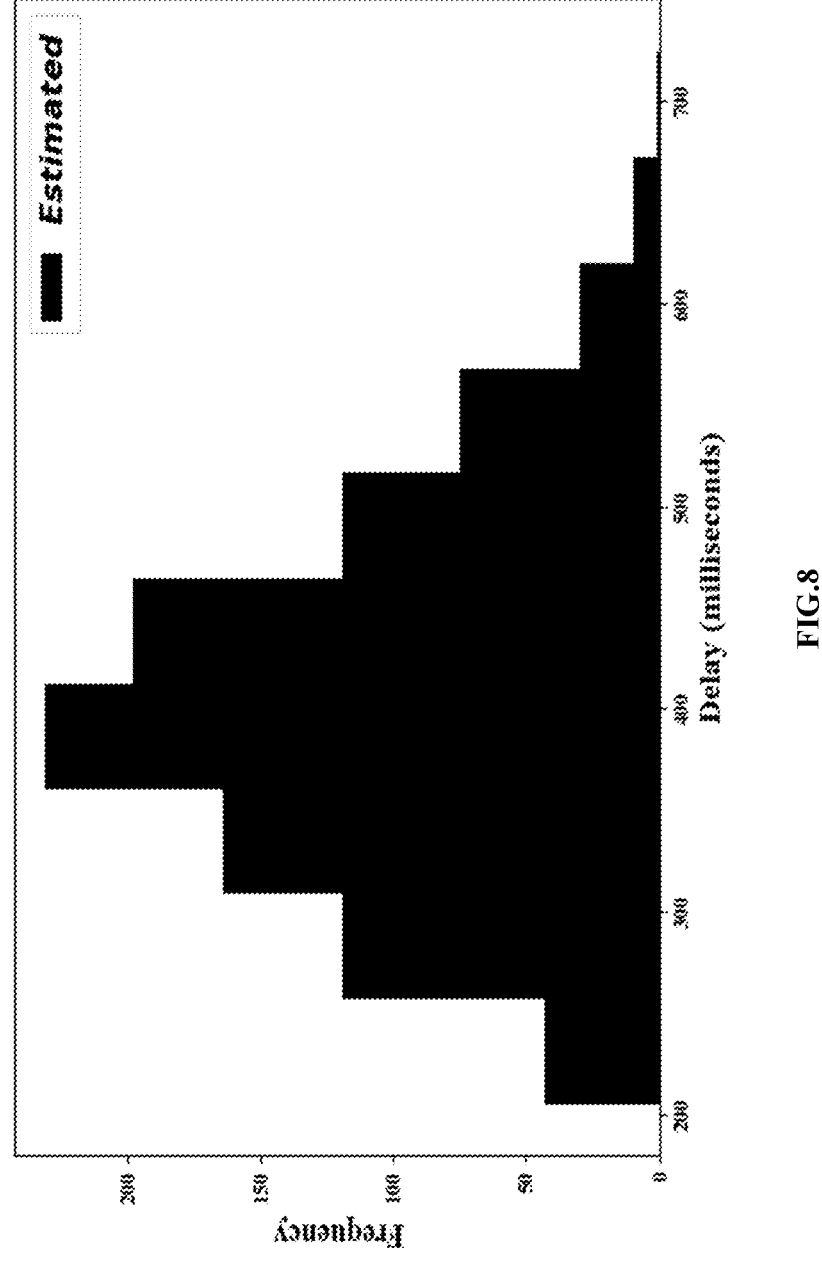
FIG. 8 illustrates a histogram of network delay during transmissions of kinematic states over the internet network using the system of FIG. 1, in accordance with some embodiments of the present disclosure.

FIG. 8 illustrates a histogram of network delay during transmissions of kinematic states over the internet network using the system of FIG. 1, in accordance with some embodiments of the present disclosure. FIG. 8 depicts the histogram showing the delay in the collected samples. It can be seen that a delays of magnitude of 400 ms were experienced most frequently in the communication channel.

Figure 9A:
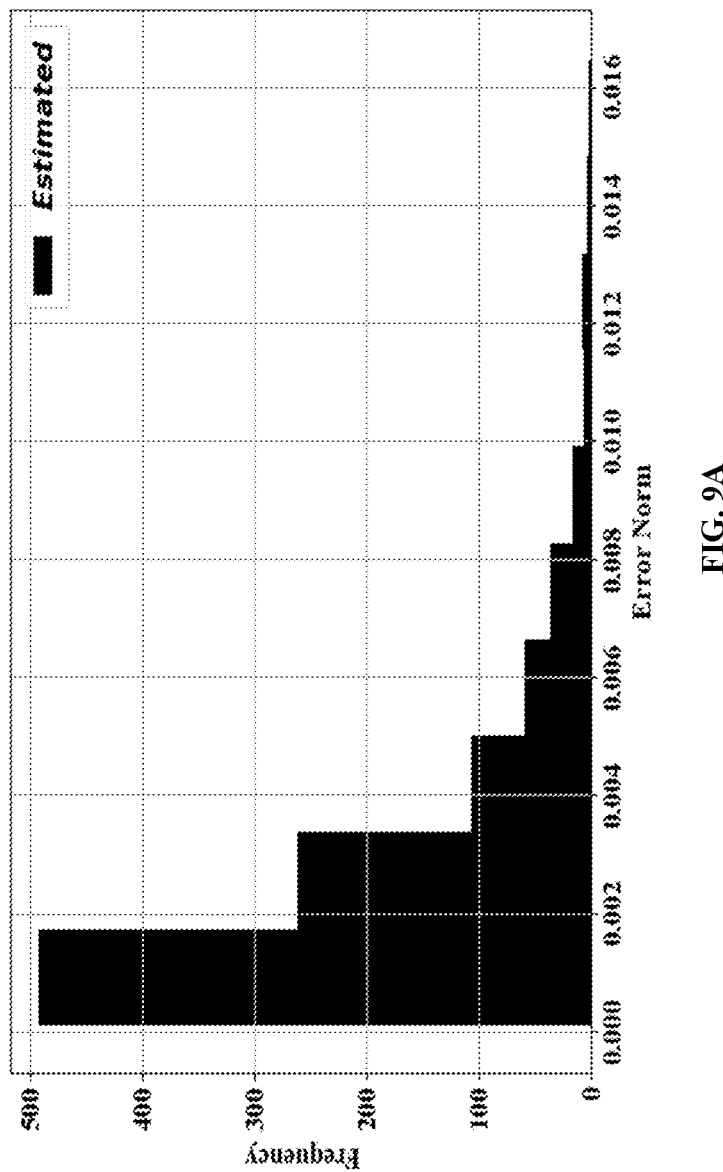
FIG. 9A and FIG. 9B illustrates an exemplary error normalization in the delayed kinematic state and estimated trajectory using the system of FIG. 1, in accordance with some embodiments of the present disclosure.
Figure 9B:
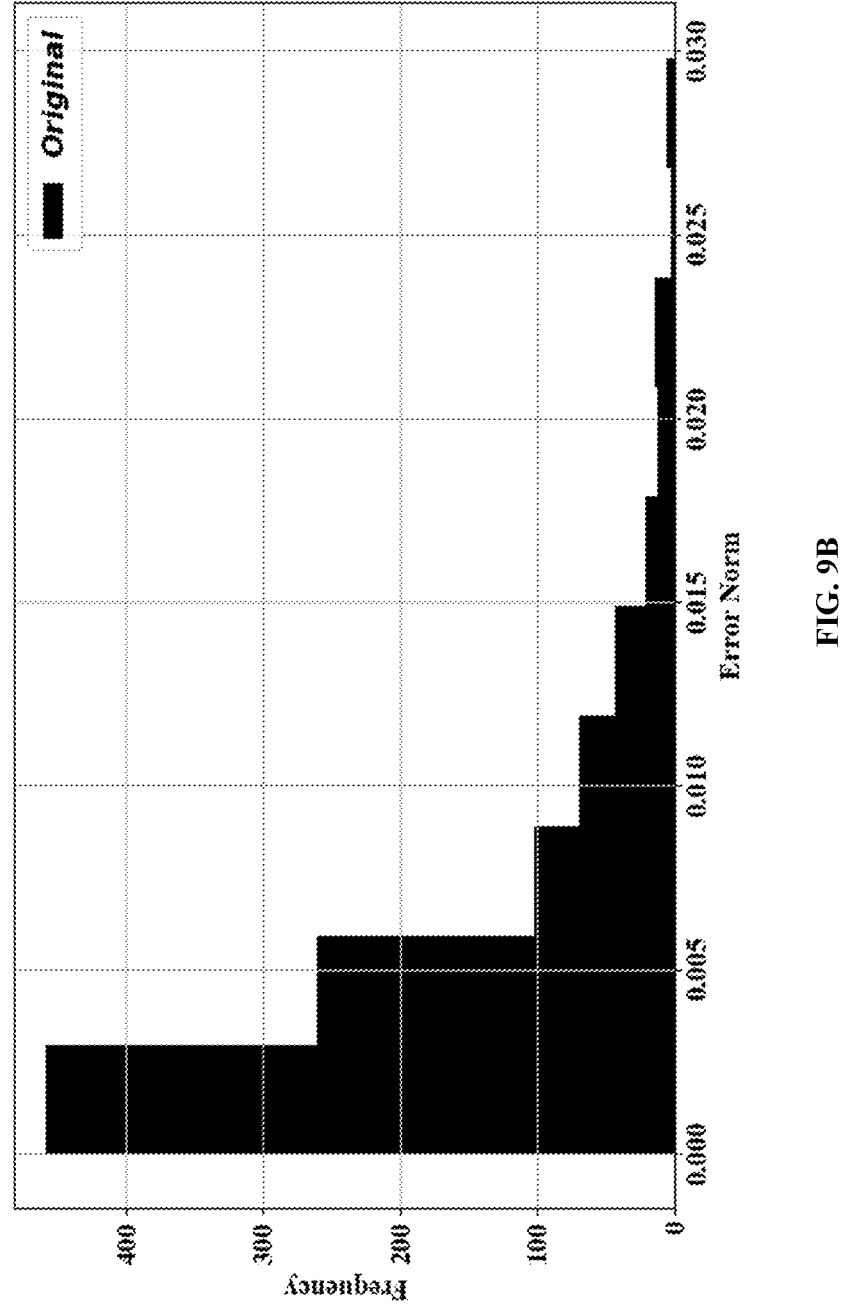

FIG. 9A and FIG. 9B illustrates an exemplary error normalization in the delayed kinematic state and estimated trajectory using the system of FIG. 1, in accordance with some embodiments of the present disclosure. FIG. 9A depicts the histogram showing the magnitude of the error between the received delayed operator's states by the mobile robot and the operator's current states on the human operator. Similarly, the histogram plot in FIG. 9B shows the magnitude of the error between the estimated operators states on the mobile robot and the current operators states on the mobile operator.

Figure 10:
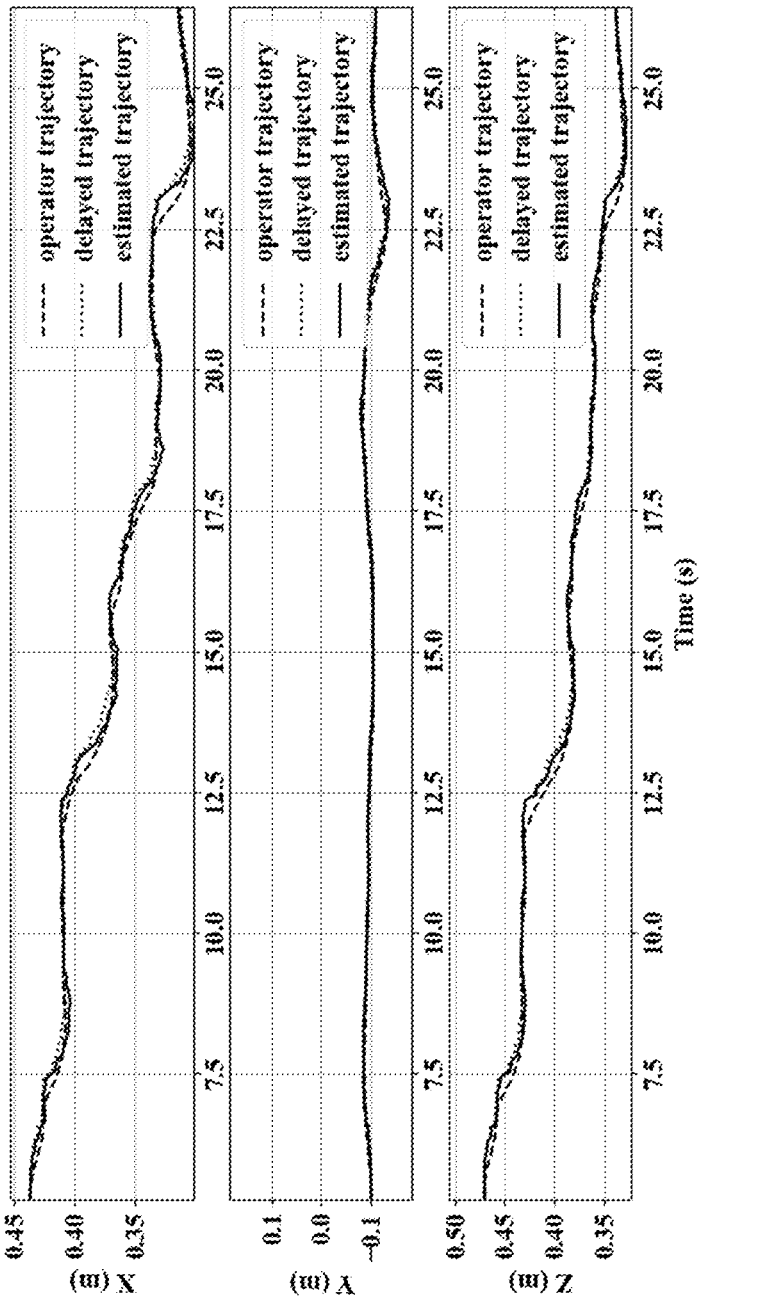
FIG. 10 illustrates an exemplary zoomed delay and estimated trajectory view using the system of FIG. 1, in accordance with some embodiments of the present disclosure.

FIG. 10 illustrates an exemplary zoomed delay and estimated trajectory view using the system of FIG. 1, in accordance with some embodiments of the present disclosure.

Figure 11:
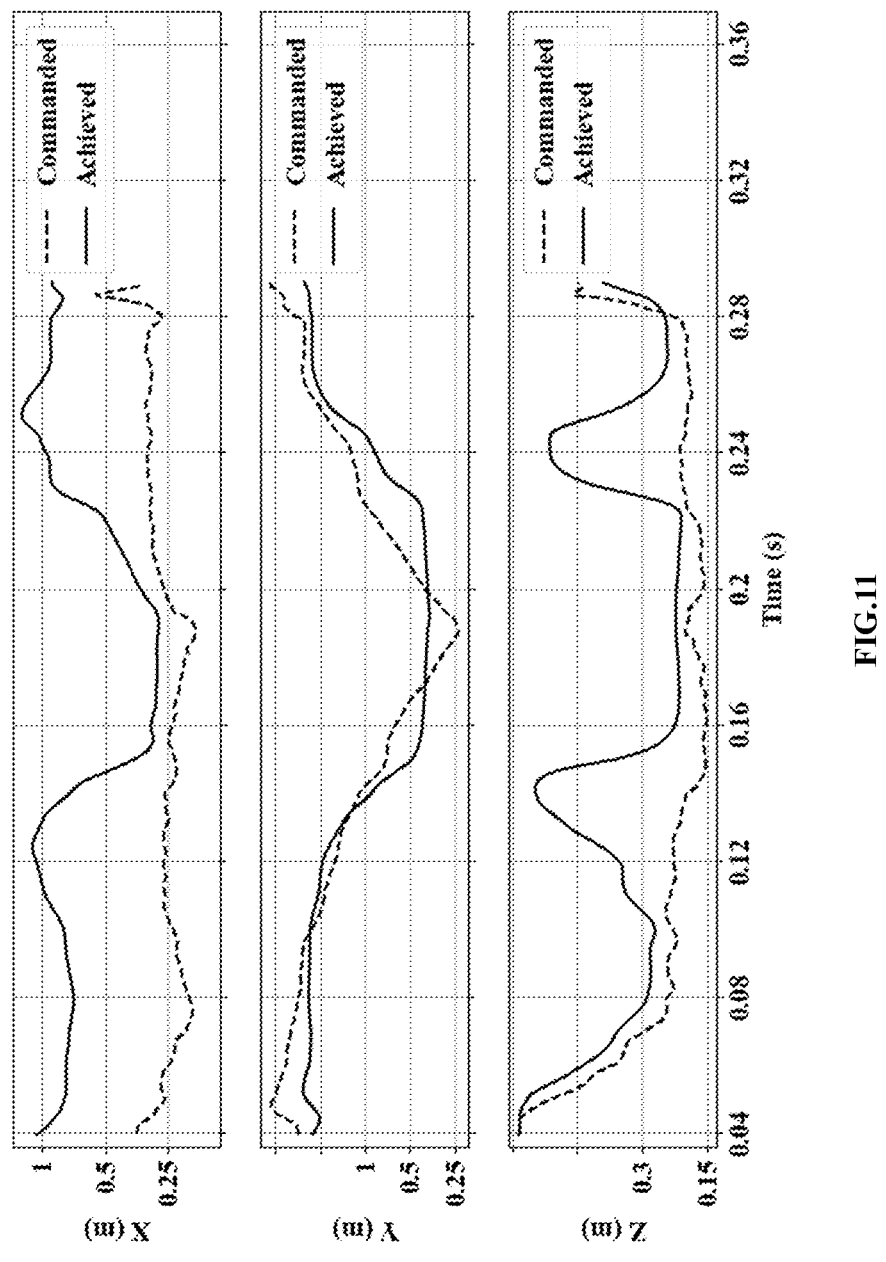
FIG. 11 illustrates an exemplary trajectory of the mobile robot while satisfying the collision constraints using the system of FIG. 1, in accordance with some embodiments of the present disclosure.

FIG. 11 illustrates an exemplary trajectory of collision constraints using the system of FIG. 1, in accordance with some embodiments of the present disclosure. For evaluating the collision avoidance constraint, operator commands the robot to move below the table, but the constraints enforce the end-effector to stay above the table surface while simultaneously avoiding the obstacle located at [0.4, 0, 0.1]T. FIG. 11 shows the trajectory corresponding to the back end forth motion of the human operator along the y-axis across the obstacle. It can be seen from the z-axis trajectories that the end-effector successfully moves over the obstacle while safely avoiding it and also maintains a constant offset of approximately 0.05 m above the table.

Figure 12:
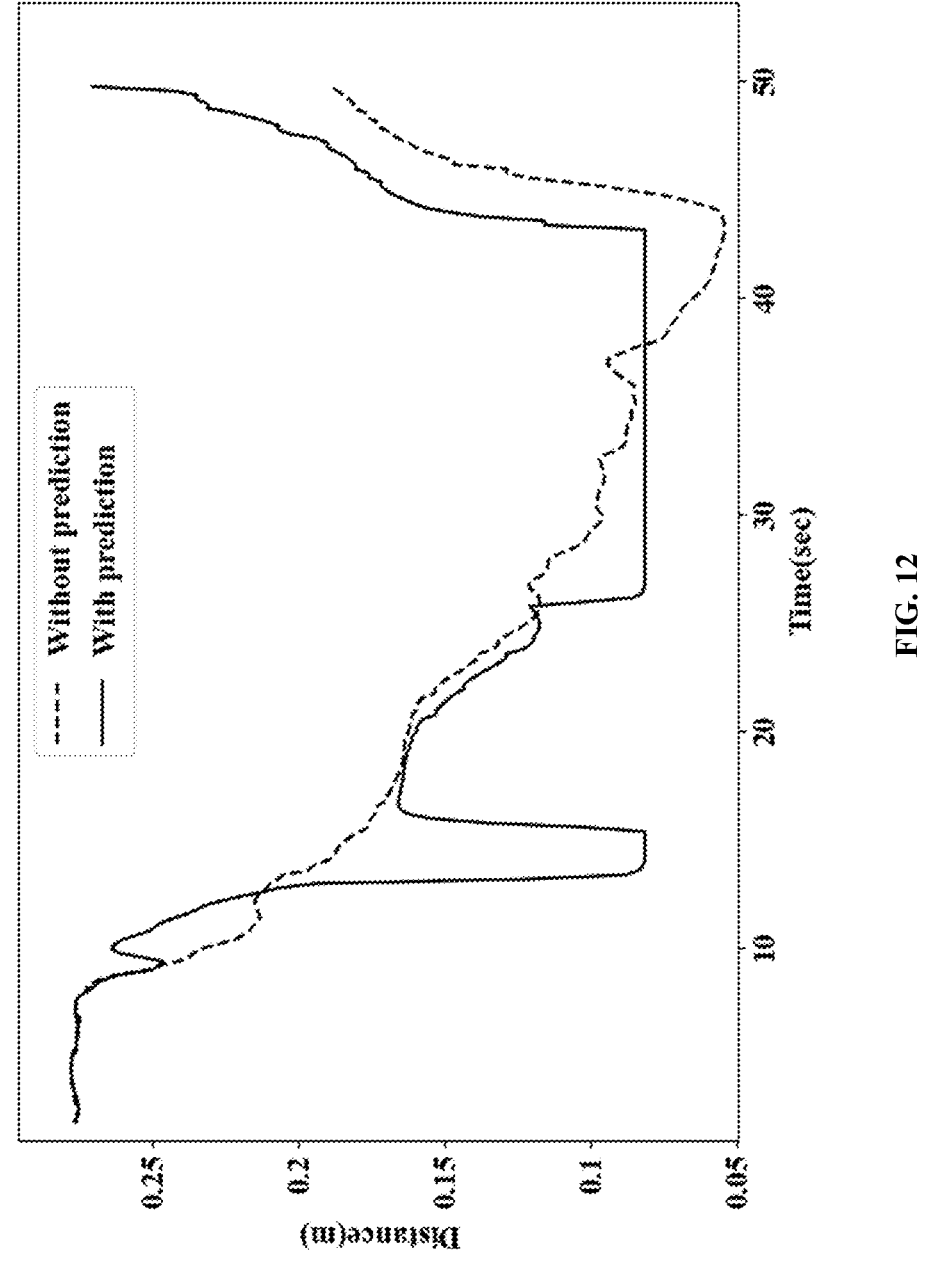
FIG. 12 illustrates an exemplary variation of distance between a specific goal and an end-effector of the mobile robot with and without goal prediction using the system of FIG. 1, in accordance with some embodiments of the present disclosure.

FIG. 12 illustrates an exemplary variation of distance between goal and end-effector with and without goal prediction during picking operation using the system of FIG. 1, in accordance with some embodiments of the present disclosure. To present efficacy of the shared control method, first an experiment is conducted to move the end effector of the mobile robot towards the goal using the teleoperation mode. The corresponding human operator commanded trajectory was further evaluated with the shared control method moving towards the goal. FIG. 12 shows the variation of the distance of the end-effector in both cases during the picking operation. It can be seen from the plot that the end-effector moves to the intended goal much earlier in the shared control case compared to the human operator mode, in which the human operator has to move with fine motions to reach the goal. On an average it was observed that the pure teleoperation case required approximately 115 sec to complete the experiment while shared control took 74 sec. For the shared control, the first approach to the goal occurs due to the human operator motion toward the goal, which can be observed from steadily decreasing distance. When the human operator approach velocity towards the goal decreases, the confidence in the human operator terminal goal increases and the control switches back to the human operator. But as the distance between the human operator and the goal decreases, the confidence in the goal increases, and control switches back to the autonomous mode, taking the robot to the goal position. The difference in the trajectories of the two modes during the human operator tracking is because the shared control tracks the terminal state of the predicted trajectory, while pure teleoperation follows the current position of the human operator.

Comparison Results-Previous evaluations involved trained human operators using the entire proposed architecture. Evaluation study was conducted with inexperienced human operators to verify the benefits of the proposed method over baseline values. Each human operator was asked to perform a block placement task (FIG. 6). The study was a 2×2 design in which the teleoperated system was executed one of the controllers (IK or MPC) and model propagation for delay compensation was active or inactive (MP or NMP). Each human operator performance was evaluated based on the time required to complete the task.

TABLE 1

| Summary of trial times in box placement(s) | | |
| --- | --- | --- |
| Condition | Mean | Standard Deviation |
| IK, NMP | 70.81 | 12.26 |
| IK, MP | 70.53 | 12.80 |
| MPC, NMP | 78.92 | 21.67 |
| MPV, MP | 72.25 | 14.62 |

As shown in Table 1, the model propagation technique is slightly faster on average for both control methods. Although the model predictive control is slower than IK, it included the collision avoidance constraints, resulting in safer operation. Two-way ANOVA with Bonferroni correction was used to compare method of control factors (IK, MPC) and presence of model propagation (NMP, MP). These factors were found not to be statistically significant in their effect on trial time reduction in the pilot study, $p=0.48$ for MPC vs IK and $p=0.33$ for NMP vs MP. However, this trend suggests that more comprehensive user research in the future may show greater impact of these factors on human operator performance.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem of reconstructing human operator intended goal using shared workspace. The embodiment, thus provides system and method of reconstructing human motion for mobile robot teleoperation in a shared workspace.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method to reconstruct human motion for mobile robot teleoperation using a shared control, comprising:

acquiring by a control unit of a mobile robot executed via one or more hardware processor an input feed of a human operator, wherein the input feed is acquired during an assistance provided by the human operator to the mobile robot, to perform a task in a remote environment, wherein the input feed comprises of one or more actions of the human operator providing the assistance to perform the task comprising of at least one goal among a plurality of goals, wherein the remote environment is shared or not shared between the human operator and the mobile robot, wherein at least one goal intended by the human in the remote environment is determined by performing the steps of:

computing a goal score for each goal among the plurality of goals based on (i) a distance between instantaneous human operator position and each goal position, and (ii) human operator velocity towards each goal;

computing a goal confidence from the corresponding goal score of each goal to determine the human operator intended goal; and computing a long term confidence using an exponential smoothing of the goal confidence to transfer control from the human operator to the mobile robot to reach at least one goal intended by the human operator based on the long term confidence in the remote environment;

receiving by the control unit of the mobile robot executed via the one or more hardware processors in the remote environment, (i) a delayed kinematic state associated with a plurality of measurements of the human operator (ii) a timestamp of the delayed kinematic state, wherein the plurality of measurements corresponds to the position of operators shoulder, elbow and the wrist angular velocity; and reconstructing by the control unit of the mobile robot executed via the one or more hardware processors to follow a trajectory of the human operator towards the intended goal in the remote environment, wherein the step comprises:

identifying a future trajectory of the human operator based on (i) the delayed kinematic state associated with the plurality of measurements of the human operator and (ii) the timestamp of the delayed kinematic state to determine the intended goal;

determining at least one goal intended by the human operator in the remote environment based on (i) a previously occurred state associated with the plurality of measurements, (ii) the current kinematic state associated with the plurality of measurements of the human, (iii) the future trajectory of the human operator, and (iv) a known position of the plurality of goals; and generating at least one instruction by a model predictive control of the mobile robot to control the movement of the mobile robot to perform at least one of (i) following the trajectory of the human operator, and (ii) reaching the operator's intended goal based on a joint angle position and a velocity of the mobile robot.

2. The processor implemented method of claim 1, wherein the plurality of measurements of the human operator includes at least one of (i) computing a first azimuth angle and an first elevation angle made by the link connecting a shoulder frame and an elbow frame at the shoulder frame, (ii) a rate of change of the first azimuth angle and the first elevation angle, (iii) computing a second azimuth angle and a second elevation angle made by the link connecting an elbow frame and a wrist frame at the elbow frame, and (iv) a rate of change of the second azimuth angle and the second elevation angle.

3. The processor implemented method of claim 1, wherein a delay time is a difference between (i) the timestamp of the delayed kinematic state associated with the plurality of measurements of the human operator received by the mobile robot and (ii) the current time stamp of the mobile robot.

4. The processor implemented method of claim 3, wherein a delay compensated state is estimated at every time step based on (i) the delayed kinematic state associated with the plurality of measurements of the human operator, the delay time, the current time stamp of the mobile robot.

5. The processor implemented method of claim 4, wherein the delay compensated state is sampled from the estimate of the future state trajectory of the human operator at current time stamp of the mobile robot.

6. The processor implemented method of claim 5, wherein the control is transferred from the human operator to the mobile robot when the long term confidence exceeds a goal confidence threshold.

7. The processor implemented method of claim 1, wherein the model predictive control generates at least one instruction for the mobile robot to control the movement of the mobile robot by performing the steps of:

obtaining the future position trajectory of the human operator as a reference for the model predictive control; and computing a cost function based on the goal confidence to minimize error between the position and orientation of the end effector of the mobile robot and the wrist position and orientation of the human operator based on (i) a future position trajectory of the human operator obtained from the future kinematic state associated with the plurality of measurements of the human operator, (ii) a collision avoidance constraint, (iii) a singular avoiding constraint and (iv) a joint limit constraint.

8. The processor implemented method of claim 7, wherein the human operator is tracked when the goal confidence is lesser than the goal confidence threshold.

9. The processor implemented method of claim 7, wherein the mobile robot moves towards the identified intended goal of the human operator when the goal confidence is higher than the goal confidence threshold.

10. A system to reconstruct human motion for mobile robot teleoperation using a shared control, comprising:

a memory storing instructions;

one or more communication interfaces; and one or more hardware processors coupled to the memory via the one or more communication interfaces, wherein the one or more hardware processors are configured by the instructions:

acquiring by a control unit of a mobile robot an input feed of a human operator, wherein the input feed is acquired during an assistance provided by the human operator to the mobile robot, to perform a task in a remote environment, wherein the input feed comprises one or more actions of the human operator providing the assistance to perform the task comprising at least one goal among a plurality of goals, wherein the remote environment is shared or not shared between the human operator and the mobile robot, wherein at least one goal intended by the human in the remote environment is determined by performing the steps of:

computing a goal score for each goal among the plurality of goals based on (i) a distance between instantaneous human operator position and each goal position, and (ii) human operator velocity towards each goal;

computing a goal confidence from the corresponding goal score of each goal to determine the human operator intended goal; and computing a long term confidence using an exponential smoothing of the goal confidence to transfer control from the human operator to the mobile robot to reach at least one goal intended by the human operator based on the long term confidence in the remote environment;

receiving by the control unit of the mobile robot executed in the remote environment, (i) a delayed kinematic state associated with a plurality of measurements of the human operator (ii) a timestamp of the delayed kinematic state, wherein the plurality of measurements corresponds to an arm position, a shoulder velocity, an elbow angular velocity, and a wrist angular velocity; and reconstructing by the control unit of the mobile robot to follow a trajectory of the human operator towards the intended goal in the remote environment, wherein the step comprises:

identifying a future trajectory of the human operator based on (i) the delayed kinematic state associated with the plurality of measurements of the human operator and (ii) the timestamp of the delayed kinematic state to determine the intended goal;

determining at least one goal intended by the human operator in the remote environment based on (i) a previously occurred state associated with the plurality of measurements, (ii) the current kinematic state associated with the plurality of measurements of the human, (iii) the future trajectory of the human operator, and (iv) a known position of the plurality of goals;

generating at least one instruction by a model predictive control of the mobile robot to control the movement of the mobile robot to perform at least one of (i) following the trajectory of the human operator, and (ii) reaching the operator intended goal based on a joint angle position and a velocity of the mobile robot.

11. The system of claim 10, wherein the plurality of measurements of the human operator includes at least one of (i) computing a first azimuth angle and an first elevation angle made by the link connecting a shoulder frame and an elbow frame at the shoulder frame, (ii) a rate of change of the first azimuth angle and the first elevation angle, (iii) computing a second azimuth angle and a second elevation angle made by the link connecting an elbow frame and a wrist frame at the elbow frame, and (iv) a rate of change of the second azimuth angle and the second elevation angle.

12. The system of claim 10, wherein a delay time is a difference between the timestamp of (i) the delayed kinematic state associated with the plurality of measurements of the human operator received by the mobile robot and (ii) the current time stamp of the mobile robot.

13. The system of claim 12, wherein a delay compensated state is estimated at every time step based on (i) the delayed kinematic state associated with the plurality of measurements of the human operator, the delay time, the current time stamp of the mobile robot.

14. The system of claim 13, wherein the delay compensated state is sampled from the estimate of the future state trajectory of the human operator at current time stamp of the mobile robot.

15. The system of claim 10, wherein the control is transferred from the human operator to the mobile robot when the long term confidence exceeds a goal confidence threshold.

16. The system of claim 10, wherein the model predictive control generates at least one instruction for the mobile robot to control the movement of the mobile robot by performing the steps of:

obtaining the future position trajectory of the human operator as a reference for the model predictive control; and computing a cost function based on the goal confidence to minimize error between the position and orientation of the end effector of the mobile robot and the wrist position and orientation of the human operator based on (i) a future position trajectory of the human operator obtained from the future kinematic state associated with the plurality of measurements of the human operator, (ii) a collision avoidance constraint, (iii) a singular avoiding constraint and (iv) a joint limit constraint.

17. The system of claim 16, wherein the human operator is tracked when the goal confidence is lesser than the goal confidence threshold, wherein the mobile robot moves towards the identified intended goal of the human operator when the goal confidence is higher than the goal confidence threshold.

18. One or more non-transitory machine-readable information storage mediums comprising one or more instructions which when executed by one or more hardware processors cause:

acquiring by a control unit of a mobile robot executed an input feed of a human operator, wherein the input feed is acquired during an assistance provided by the human operator to the mobile robot, to perform a task in a remote environment, wherein the input feed comprises of one or more actions of the human operator providing the assistance to perform the task comprising of at least one goal among a plurality of goals, wherein the remote environment is shared or not shared between the human operator and the mobile robot, wherein at least one goal intended by the human in the remote environment is determined by performing the steps of:

computing a goal score for each goal among the plurality of goals based on (i) a distance between instantaneous human operator position and each goal position, and (ii) human operator velocity towards each goal;

computing a goal confidence from the corresponding goal score of each goal to determine the human operator intended goal; and computing a long term confidence using an exponential smoothing of the goal confidence to transfer control from the human operator to the mobile robot to reach at least one goal intended by the human operator based on the long term confidence in the remote environment;

receiving by the control unit of the mobile robot executed in the remote environment, (i) a delayed kinematic state associated with a plurality of measurements of the human operator (ii) a timestamp of the delayed kinematic state, wherein the plurality of measurements corresponds to the position of operators shoulder, elbow and the wrist angular velocity; and reconstructing by the control unit of the mobile robot to follow a trajectory of the human operator towards the intended goal in the remote environment, wherein the step comprises:

identifying a future trajectory of the human operator based on (i) the delayed kinematic state associated with the plurality of measurements of the human operator and (ii) the timestamp of the delayed kinematic state to determine the intended goal;

determining at least one goal intended by the human operator in the remote environment based on (i) a previously occurred state associated with the plurality of measurements, (ii) the current kinematic state associated with the plurality of measurements of the human, (iii) the future trajectory of the human operator, and (iv) a known position of the plurality of goals; and generating at least one instruction by a model predictive control of the mobile robot to control the movement of the mobile robot to perform at least one of (i) following the trajectory of the human operator, and (ii) reaching the operator's intended goal based on a joint angle position and a velocity of the mobile robot.

\* \* \* \* \*